(12) United States Patent
Gambrill

(10) Patent No.: US 7,370,781 B2
(45) Date of Patent: May 13, 2008

(54) VERSATILE CELLULAR TELEPHONE HOLDER

(76) Inventor: Gwendolyn Gambrill, 2510 Parkview Rd., Baltimore, MD (US) 21207

( * ) Notice: Subject to any disclaimer, the term of this patent is extended or adjusted under 35 U.S.C. 154(b) by 82 days.

(21) Appl. No.: 11/025,049

(22) Filed: Dec. 30, 2004

(65) Prior Publication Data

US 2006/0144886 A1 Jul. 6, 2006

(51) Int. Cl.
- A45F 3/04 (2006.01)
- A45F 4/00 (2006.01)
- A45F 3/00 (2006.01)

(52) U.S. Cl. .................... 224/647; 244/648; 244/649; 244/650; 244/652; 244/583; 244/604

(58) Field of Classification Search .............. 224/647, 224/468, 652, 583, 648, 604, 649, 650
See application file for complete search history.

(56) References Cited

U.S. PATENT DOCUMENTS

| | | | |
|---|---|---|---|
| 3,446,260 A * | 5/1969 | Osher .......................... | 150/147 |
| 3,648,906 A * | 3/1972 | Ross ........................... | 224/605 |
| D245,461 S * | 8/1977 | Jones, Jr. ..................... | D3/230 |
| 5,263,618 A * | 11/1993 | Talavera ................... | 224/148.5 |
| 5,358,159 A | 10/1994 | Lundie, Jr. | |
| D371,137 S | 6/1996 | Kriegh | |
| 5,586,704 A | 12/1996 | Alexander et al. | |
| 5,653,367 A * | 8/1997 | Abramson ................... | 224/581 |
| 5,711,469 A * | 1/1998 | Gormley et al. ............ | 224/675 |
| D395,545 S | 6/1998 | Crim, Jr. | |
| 5,775,398 A * | 7/1998 | Siegel ......................... | 150/139 |
| 5,775,558 A * | 7/1998 | Montalbano ................ | 224/627 |
| 6,209,769 B1 * | 4/2001 | Seals et al. .................. | 224/583 |
| D451,915 S | 12/2001 | Dalmau | |
| 6,543,661 B1 * | 4/2003 | Lazur .......................... | 224/604 |
| 6,568,575 B1 * | 5/2003 | Bartholomew .............. | 224/583 |
| 6,598,771 B2 * | 7/2003 | Norman ....................... | 224/160 |
| 2001/0035444 A1 * | 11/2001 | Alis ............................. | 224/250 |
| 2004/0226836 A1 * | 11/2004 | Schreiber et al. ........... | 206/305 |

* cited by examiner

*Primary Examiner*—Nathan J. Newhouse
*Assistant Examiner*—Lester L. Vanterpool
(74) *Attorney, Agent, or Firm*—Connolly Bove Lodge & Hutz LLP; Myron Keith Wyche

(57) ABSTRACT

The present invention is directed to a versatile holder or holster for portable telephones and other personal items, wherein the holder is secured to either side of the body of the user in any physical orientation (e.g., either horizontal or vertical). The versatile portable telephone holder or holster of the present invention securely retains the portable telephones telephone and/or other personal items, regardless of the physical orientation of the holder.

28 Claims, 4 Drawing Sheets

Fig.1.
Fig.2.
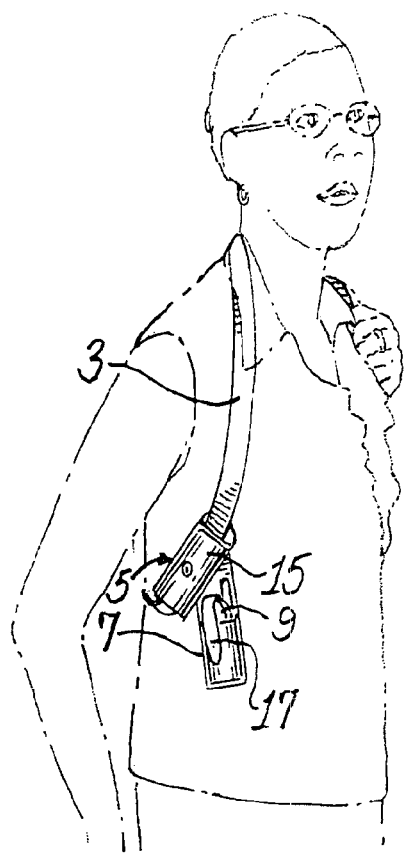
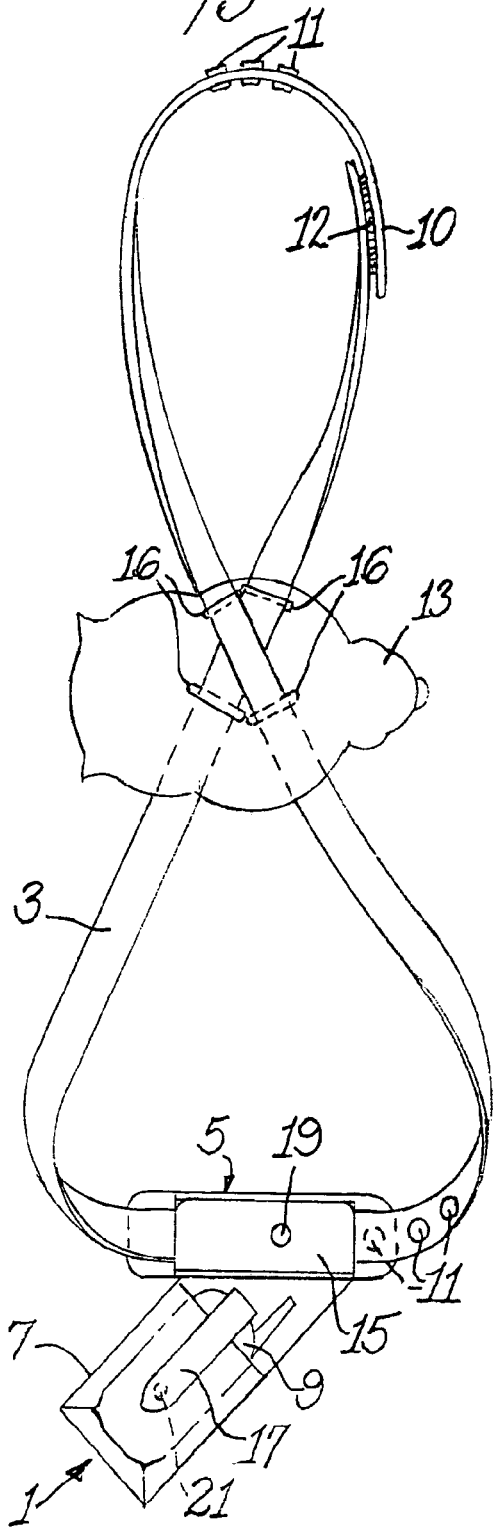

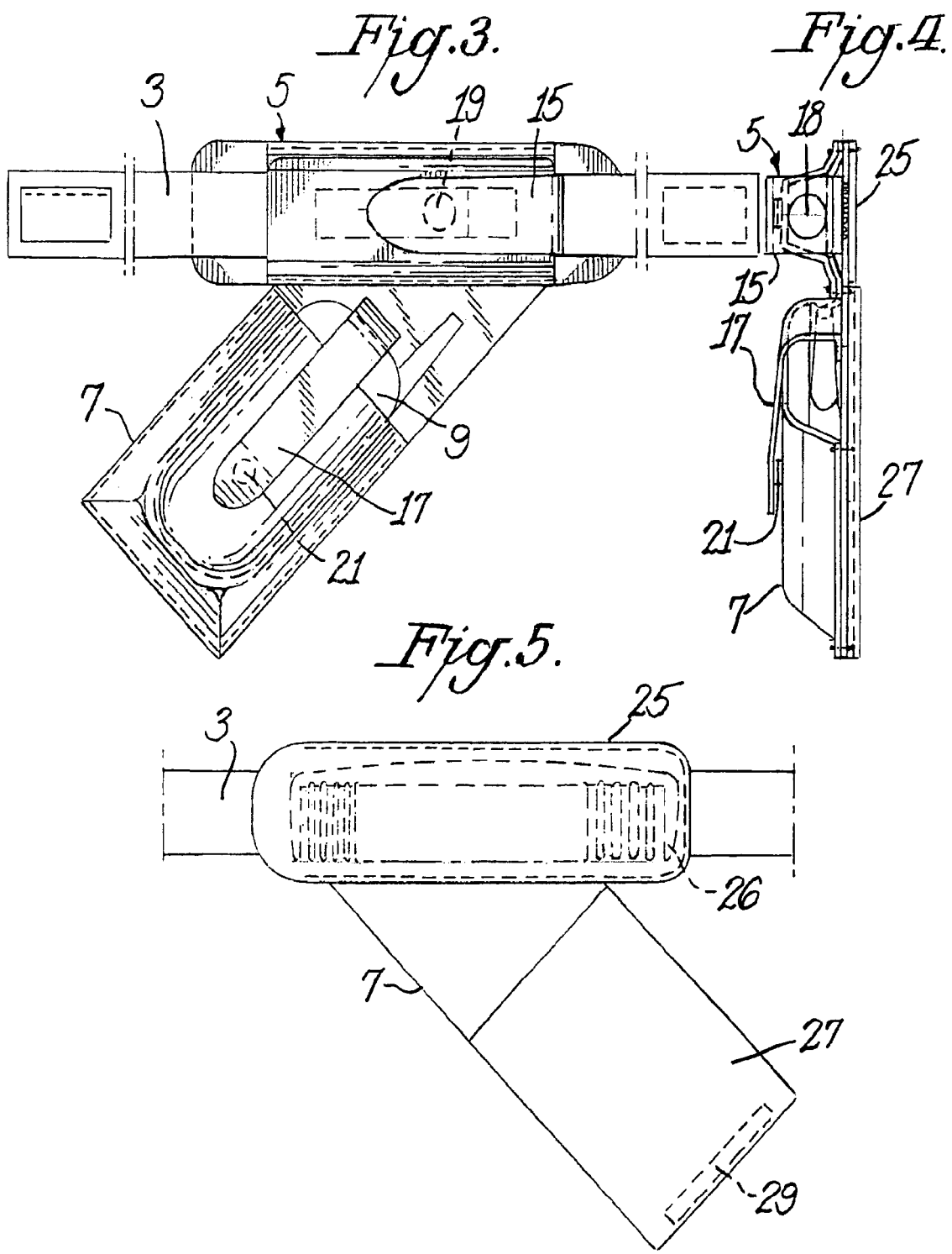

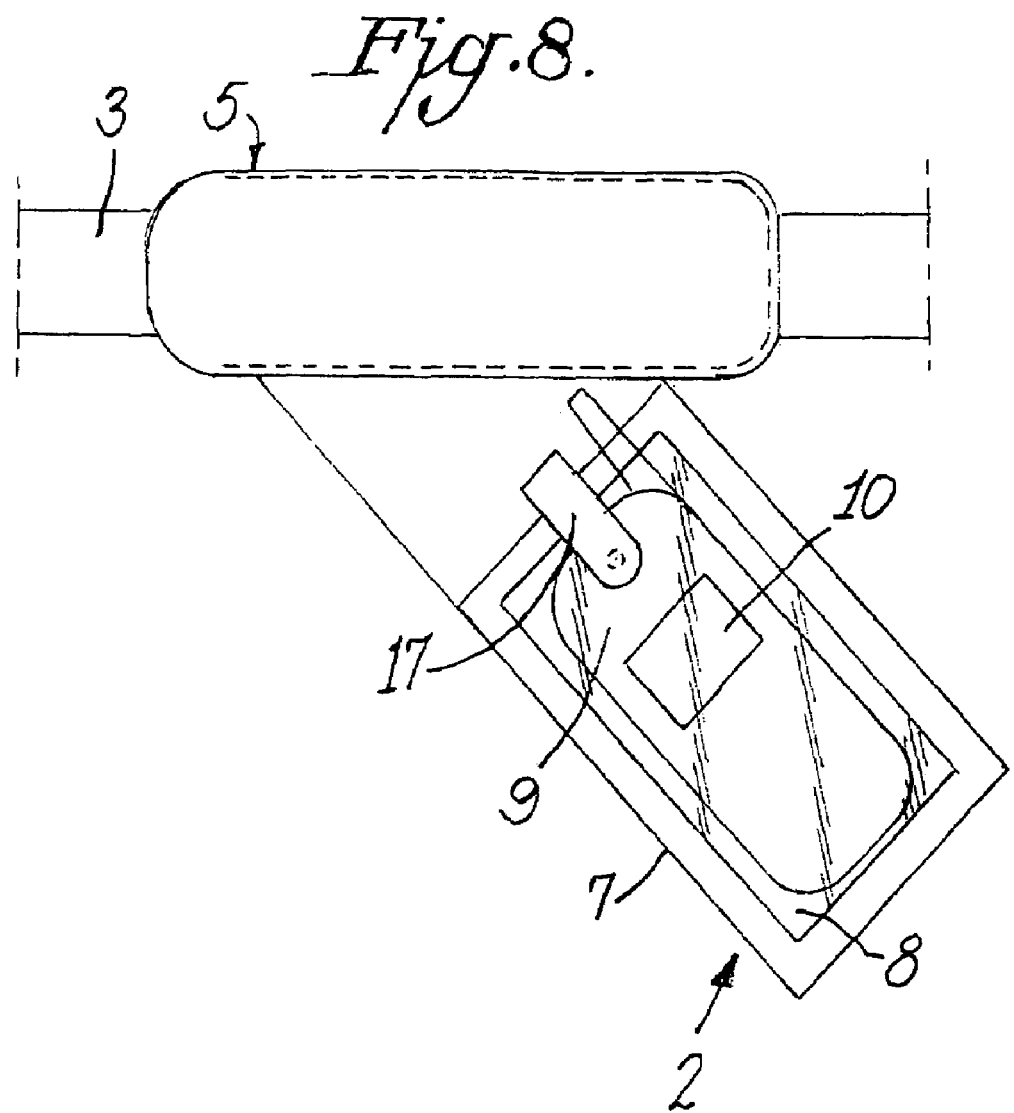

VERSATILE CELLULAR TELEPHONE HOLDER

BACKGROUND OF THE INVENTION

The field of the invention is generally related to holding/carrying means for portable telephones and other personal items. In particular, the present invention is directed to a holder that retains a portable telephone and other useful items in a readily accessible position on the body of a user.

In order to insure the maximum utilization of a portable telephone for receiving incoming calls and placing outgoing calls, a user frequently carries the telephone by some type of holding means on or near their body. For example, users often carry their portable telephones inside a purse, pocket or backpack. In addition, holding means such as pouches, "fanny-packs", and other telephone holders have also been used as carrying means for the portable telephone that can be worn on the body of the user. However, when receiving an incoming call while carrying the portable telephone in these ways, the user is often rushed when attempting to answer the call due to having to locate and extract the portable telephone from inside of one of the holding/carrying means discussed above. In these situations, the user often misses the incoming call and thus, the maximum utilization of the portable telephone is reduced.

As portable telephones diminished in size and weight, smaller portable telephone holders that could be attached externally to the holding/carrying means discussed above and that could provide improved accessibility for the user were envisioned. For example, the portable telephone holder could be attached to a strap of a purse, outside of a pocket or to the side of a backpack. In this way, the portable telephone would be more accessible to the user since they would no longer have to extract the phone from inside the holding/carrying means. An additional benefit of locating the smaller portable telephone holders externally is the capability to extend the antenna on the telephone to enhance the ability of the telephone to receive incoming calls without removing the portable telephone from the holder.

Further, smaller portable telephones have allowed for the expansion of the functionality of the portable telephone holder to also providing holding/carrying means for other personal items. For example, the portable telephone holder may also be used to carry items normally found in a purse, such as a cigarette lighter, lipstick, combs, or other personal care products; or in a wallet, such as cash, credit cards or personal identification. That is, a versatile portable telephone holder could also provide the functionality of a purse or wallet. This additional functionality could be particularly useful considering the heightened concerns about homeland security in today's world. Due to these concerns, users are often required to frequently show picture identification or other personal credentials that are typically carried inside a purse or wallet. Thus, there is an increasing need for users to always carry such credentials and to be able to quickly and easily access and display these forms of personal identification.

Some examples of the background art in this field of invention include U.S. Pat. Nos. D371,137; D395,545; and D451,915. In particular, these design patents disclose cellular telephone holders with an upwardly opening receptacle for holding a portable telephone. However, a possible shortcoming of the cellular telephone holders discussed above is that their upwardly opening receptacles may not provide sufficient restraint or security for the portable telephone in all environments. That is, a portable telephone in a holder using the configurations discussed above could potentially fall out of the holder or be easily stolen from the holder.

Other examples of background art in this field of invention include U.S. Pat. Nos. 5,358,159; 5,586,704; and 6,543,661. Each of the patents discussed above disclose a shoulder holster or harness for holding a portable telephone. However, both the 159' and 704' patents have the same shortcoming of an upwardly open receptacle for the telephone, as discussed above. In addition, both the 159' and 704' secure the telephone so tightly to the body of user that a potential benefit, the quick and easy access to both sides of the portable telephone holder, is not an option.

Further, the 661' patent discloses a shoulder harness for carrying personal items on an upper body portion of a user. The shoulder harness of the 661' patent includes a main harness member designed to be worn over the shoulders of a user that includes a plurality of detachable holders for carrying personal items. However, the 661' patent does not provide the ability to quickly and easily access and display such personal items as identification cards and credit cards without detaching a holder, opening the holder and extracting the cards. That is, these credentials are not easily accessible while the holders are attached to the shoulder harness.

Therefore, there is a need in the art for a holding/carrying means for both a portable telephone and other personal items that provides for both maximum utilization of the portable telephone and quick and easy access to the personal items.

SUMMARY OF THE INVENTION

The present invention is directed to a versatile holder or holster for portable telephones and other personal items, wherein the holder is secured to either side of the body of the user in any physical orientation (e.g., either horizontal or vertical). The versatile portable telephone holder or holster of the present invention securely retains portable telephones and/or other personal items, regardless of the physical orientation of the holder.

In addition, the versatile portable telephone holder is comprised of multiple compartments, so that portable telephones, other appliances of different sizes and shapes, and personal items can easily be accommodated. The contents of the versatile portable telephone holder of the present invention are: (1) quickly and easily accessible; and (2) securely contained in the multiple compartments of the holder. To provide these dual capabilities, the versatile portable telephone holder of the present invention utilizes securing/fastening means that include, but are not limited to an elongated tongue of material with cooperating hook and eye fasteners, VELCRO® fasteners, buttons, zippers, latches and hooks to secure the contents of the compartments.

One embodiment of the present invention is a portable telephone holder comprising: a first compartment; a portable telephone compartment connected to and located below a front side of the first compartment; a second compartment connected to and located on a back side of the first compartment; and a third compartment connected to and located on a back side of the portable telephone compartment, wherein the first compartment, second compartment, third compartment and portable telephone compartment are configured to both secure contents within and to provide easy access to the contents within each compartment.

Another embodiment of the present invention is a portable telephone holster comprising: an adjustable shoulder strap; a decorative template configured to align the adjustable shoulder strap; a first compartment selectably attached to the adjustable shoulder strap; a portable telephone compartment connected to and located below a front side of the first compartment; a second compartment connected to and located on a back side of the first compartment; and a third compartment connected to and located on a back side of the portable telephone compartment, wherein the first compartment, second compartment, third compartment and portable telephone compartment are configured to both secure contents within and to provide easy access to the contents within each compartment.

Preferably both the portable telephone holder and the portable telephone holster are configured to be worn on at least one of the left and right sides of an adjustable strap or belt. Preferably, the portable telephone holster comprises an adjustable strap that further comprises at least three eyelets configured to provide for attaching the portable telephone holster at different locations on the adjustable shoulder strap. Preferably, the first compartment further comprises at least one fastener for attaching the first compartment at different locations on the adjustable shoulder strap.

Preferably, the first compartment and the portable telephone compartment further comprise restraining straps configured to both secure and provide easy access to the contents within each compartment. Preferably, the restraining strap of the first compartment and portable telephone compartment are secured to a front side of each compartment with at least one of a hook and eye fastener, a latch and hook, VELCRO® fasteners, buttons, and zippers.

Preferably, the second compartment and the third compartment further comprise fasteners configured to both secure and provide easy access to the contents within each compartment. Preferably, the second compartment and third compartment are secured with at least one of a hook and eye fastener, a latch and hook, VELCRO® fasteners, buttons, and zippers.

Preferably, the portable telephone compartment further comprises a clear window configured to allow contents of the portable telephone compartment to be viewed without opening the portable telephone compartment. Preferably, the third compartment further comprises a clear window configured to allow contents of the third compartment to be viewed without opening the third compartment.

BRIEF DESCRIPTION OF THE DRAWINGS

The invention can be described in greater detail with the aid of the following drawings.

FIG. 1. is a perspective view of a user wearing an exemplary embodiment of a versatile portable telephone holder.

FIG. 2. is a front elevational view of an exemplary embodiment of the versatile portable telephone holder.

FIG. 3. is another front elevational view of an exemplary embodiment of the versatile portable telephone.

FIG. 4. is a right side elevational view of an exemplary embodiment of the versatile portable telephone holder showing multiple compartments on both the front and back sides of the versatile portable telephone holder.

FIG. 5. is a back elevational view of an exemplary embodiment of the versatile portable telephone holder showing multiple compartments on the back side of both the versatile portable telephone holder and adjacent to the portable telephone compartment.

FIG. 8. is a front elevational view of another exemplary embodiment of the versatile portable telephone holder showing a portable telephone compartment with a clear window.

DETAILED DESCRIPTION OF THE PREFERRED EMBODIMENT

Figure 6:
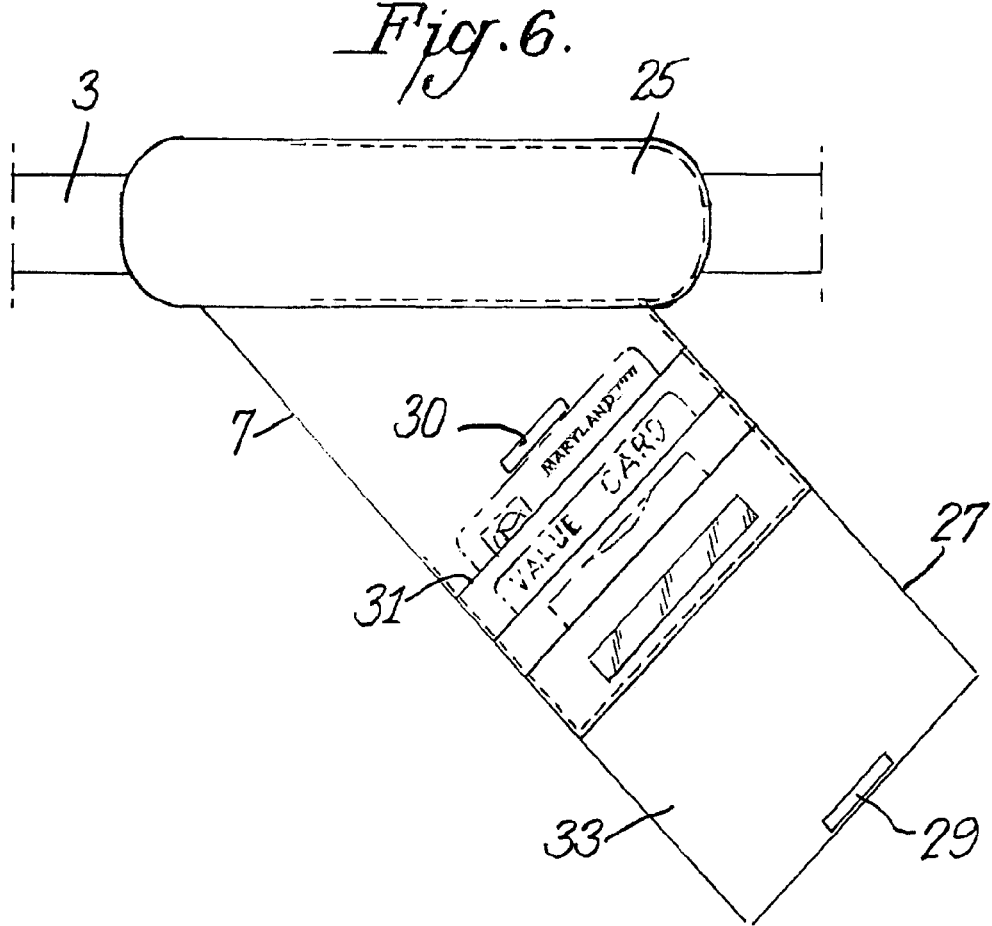
FIG. 6. is a back elevational view of an exemplary embodiment of the versatile portable telephone holder showing the third compartment located on the back side of the versatile portable telephone holder and adjacent to the portable telephone compartment with the cover open.

FIG. 1. is a perspective view of a user wearing an exemplary embodiment of a versatile portable telephone holster. FIG. 1 shows the versatile portable telephone holster comprising: an adjustable shoulder strap 3; a first compartment 5 on the front side of the versatile telephone holder 1 and the shoulder strap 3; and a portable telephone compartment 7 on the front side of the versatile telephone holder 1. The portable telephone compartment 7 may be provided in variable shapes to conform to the physical requirements of the portable telephone. Restraining strap 15 securely contains other personal items in first compartment 5. The portable telephone compartment 7 of FIG. 1 also contains a portable telephone 9 that is restrained by a restraining strap 17. Though the restraining straps 15, 17 securely contain personal items in first compartment 5 and the portable telephone 9 in the portable telephone compartment 7, they may also be quickly released to allow easy access to the personal items and portable telephone 9. The restraining straps 15, 17 are shown in further detail in FIG. 3 and further discussed below.

FIG. 2. is a front elevational view of an exemplary embodiment of the versatile portable telephone holder. FIG. 2 shows a versatile portable telephone holder 1 comprising: an adjustable shoulder strap 3; a first compartment 5 on front side of the shoulder strap 3; and a portable telephone compartment 7. The adjustable shoulder strap 3 may be adjusted for the size and comfort of the user by using overlapping fasteners 10 located at both ends of the adjustable shoulder strap 3. In addition, the shoulder strap 3 may include sections with elastic materials (not shown) that provide for additional adjustment of the strap to conform to the physique of the user. The overlapping fasteners 10 may include, but are not limited to, cooperating hook and eye fasteners (not shown) or VELCRO® fasteners 12.

As shown in FIG. 2, the adjustable shoulder strap 3 can be held in position with a decorative template 13. The adjustable shoulder strap 3 is fed through the eyelets 16 to provide a criss-cross configuration of the adjustable shoulder strap 3 that is positioned behind the back of the user. The decorative template 13 may possess a wide variety of decorative characteristics including, but not limited to, different shapes, sizes, materials, and colors. The materials used for this decorative template 13 include, but are not limited to, cloth, latex, leather, and plastic. Clearly, none of these decorative characteristics affects the functionality of the decorative template 13 for positioning the adjustable shoulder strap 3.

The location of the versatile portable telephone holder 1 on the adjustable shoulder strap 3 can be varied by using any of several different eyelet positions 11 located along the adjustable shoulder strap 3. As shown in FIG. 2, at least three eyelet positions 11 can be used to fix the location of the versatile portable telephone holder 1 along the adjustable shoulder strap 3. At least one fastener is used to secure the versatile portable telephone holder 1 at an eyelet position 11. Alternatively, multiple fasteners can be used to secure the versatile telephone holder 1 to multiple eyelet positions 11. The user can position the versatile portable telephone holder 1 in order to optimize the ease of accessibility to the portable telephone and personal items that the holder contains.

FIG. 3. is another front elevational view of an exemplary embodiment of the versatile portable telephone. In particular, FIG. 3 shows additional details of the restraining straps 15, 17 for the front compartment 5, 7 of the versatile portable telephone holder 1. Each of the restraining straps 15, 17 are, for example but not limited to, an elongated tongue of material with cooperating hook and eye fasteners 19, 21, VELCRO® fasteners (not shown), or any securing/fastening means such as buttons, zippers, plastic clips, latches or the like that are normally used to contain items in a compartment or holder. The restraining straps 15, 17 are connected at one end within the compartments 5, 7 and loop around the top of the compartments 5, 7 to securely retain the portable telephone 9 and personal items (e.g., lipstick, combs, pens, pencils) with the hook and eye fasteners 19, 21 on the outside of front side of compartments 5, 7. The restraining straps 15, 17 provide quick and easy access to the contents of the front side compartments 5, 7. The cooperating hook and eye fasteners 19, 21 or VELCRO® fasteners (not shown) provide enough security to restrain items contained within the compartments 5, 7 and also provide quick and easy access for the user to the items within the compartments 5, 7.

FIG. 4. is a right side elevational view of an exemplary embodiment of the versatile portable telephone holder. Front side compartments 5, 7 and back side compartments 25, 27 provide quick and easy access to storage compartments for the user. As shown in FIG. 4, a first compartment 5, located on the front side of the versatile portable telephone holder 1 and adjacent to the adjustable shoulder strap 3, provides a compartment in which relatively large and thick items may be inserted for safe keeping. FIG. 4 also shows a non-limiting example of such an item, a lipstick dispenser 18, inserted in the first compartment 5.

In addition, as shown in FIG. 4 and discussed above, restraining straps 15, 17 are connected at one end within the front side compartments 5, 7. The restraining straps 15, 17 loop around the top end of the front side compartments 5, 7 to securely contain personal items and the portable telephone, respectively, within the compartments 5, 7. Cooperative hook and eye fasteners 19, 21 on the front side compartments 5, 7 secure the restraining straps 15, 17 to the compartments 5, 7 and provide quick and easy access to the items within the compartments 5, 7 for the user.

Further, FIG. 4 shows the back side compartments 25, 27. A second compartment 25, located on the back side of versatile portable telephone holder 1 that is adjacent to the first compartment 5 and the shoulder strap 3. The second compartment 25 provides a compartment in which relatively small or narrow items may be stored for safe keeping. FIG. 5 shows how a non-limiting example of such an item (i.e., a comb 26) that is inserted through an open end of the second compartment 25. The user may obtain quick and easy access to the second compartment 25, while wearing the versatile portable telephone holder 1 as shown in FIG. 1, by flipping the portable telephone compartment 7 by 180° around the axis of the shoulder strap 3. Due to the location of the second compartment 25 against the user's body and on the back side of the versatile portable telephone holder 1, items stored within the second compartment 25 are securely contained and unlikely to fall out or be easily stolen.

Further, FIG. 5. shows a back elevational view of an exemplary embodiment of the versatile portable telephone holder showing a third compartment 27, located on the back side of the versatile telephone holder 1 and adjacent to the portable telephone compartment 7. As shown in FIG. 5, the third compartment 27 may be secured by VELCRO® fasteners 29, 30, cooperating hook and eye fasteners (not shown), or any other securing/fastening means. Examples of such securing/fastening means include, but are not limited to, buttons, zippers, plastic clips, snaps, latches or the like that would provide quick and easy access to the compartment.

FIG. 6. is a back elevational view of the inside of an exemplary embodiment of the versatile portable telephone holder. As shown in FIG. 6, the third compartment 27, located on the back side of the versatile portable telephone holder 1 and adjacent to the portable telephone compartment 7. The third compartment 27 can be opened by separating VELCRO® Fasteners 29, 30 or other securing/fastening means used to secure the third compartment 27. In a non-limiting example, the third compartment 27 is closed by folding the third compartment 27 and bringing the VELCRO® fasteners 29, 30 together. In the non-limiting example shown in FIG. 6, opening the third compartment 27 provides access to credit card/identification card holders 31 and a wallet/change pouch 33. In addition, the third compartment 27 may further include a ring containing keys and/or a key retrieving device so that a key can be extended from the third compartment 27 and retrieved to the third compartment 27. The user may obtain quick and easy access to the third compartment 27, while wearing the versatile portable telephone holder 1 as shown in FIG. 1, by flipping the portable telephone compartment 7 by 180.degree. around the axis of the shoulder strap 3. Due to the location of the third compartment 27 against the user's body and on the back side of the versatile portable telephone holder 1, items stored within the third compartment 27 are securely contained in the compartment and are unlikely to fall out or be easily stolen.

Figure 7:
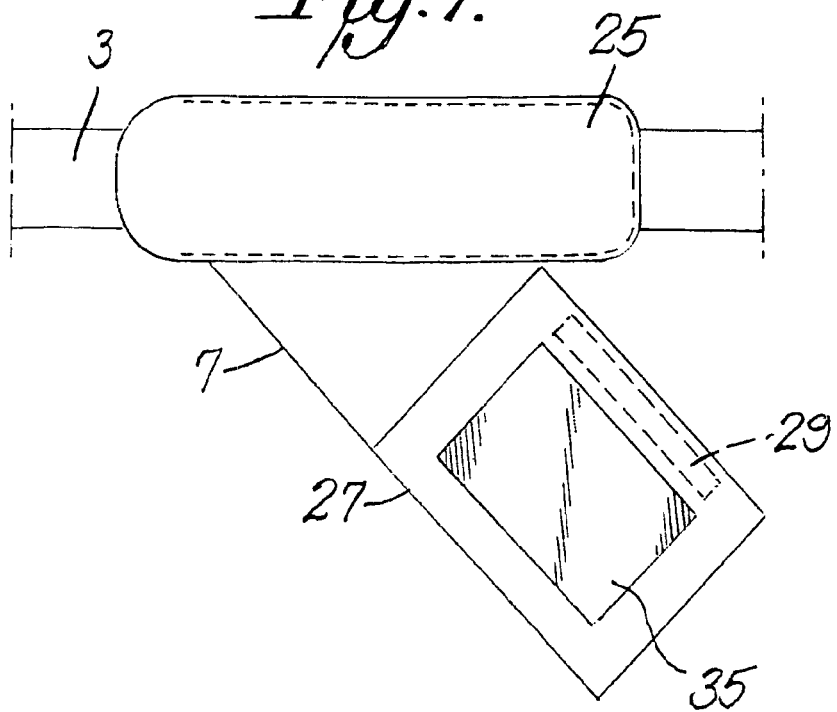
FIG. 7. is a back elevational view of another exemplary embodiment of the versatile portable telephone holder showing an alternative configuration for the third compartment located on the back side of the versatile portable telephone holder.

FIG. 7. is a back elevational view of an exemplary alternative embodiment of the versatile portable telephone holder 1 shown in FIG. 6. FIG. 7 shows a third compartment 27 located on the back side of versatile portable telephone holder 1 and adjacent to the portable telephone compartment 7. As shown in FIG. 7, the third compartment 27 further includes a clear window 35 to, for example, access or display a picture identification or other credentials that the user often must show. The clear window 35 may be made of plastic, glass or any other clear material that would allow the user to view the contents within the third compartment 27. As shown in FIG. 8, the clear window 35 allows the user to view an item (e.g., a picture identification or other credential) contained within the third compartment 27 without having to open the compartment. This capability could be used to access or display credentials that often must be shown.

In addition, VELCRO® 29, 30 (not shown) are used for securing the third compartment 27 of the alternative configuration of FIG. 7; and for displaying or accessing additional credit card/identification card holders 31 and a wallet/change pouch 33, as shown in FIG. 6. In a non-limiting example, the third compartment 27 can be opened by separating VELCRO®Fasteners 29, 30 or other securing/fastening means used to secure the third compartment 27. The third compartment 27 is closed by folding the third compartment 27 and bringing the VELCRO® fasteners 29, 30 together. The user may obtain quick and easy access to the third compartment 27, while wearing the versatile portable telephone holder 1 as shown in FIG. 1, by flipping the portable telephone compartment 7 by 180.degree. around the axis of the shoulder strap 3. Due to the location of the third compartment 27 against the user's body and on the back side of the versatile portable telephone holder 1 and adjacent to the portable telephone compartment 7, items stored within the third compartment 27 are securely contained in the compartment and unlikely to fall out or be easily stolen from the holder.

FIG. 8 shows a front elevational view of another alternative configuration for the portable telephone compartment 7 of the versatile portable telephone holder 2. The alternative configuration shown in FIG. 8 includes a clear window 8 in the portable telephone compartment 7. The window may be made of plastic, glass or any other clear material that would allow the user to view the portable telephone 9 within the portable telephone compartment 7. As shown in FIG. 8, the clear window 8 allows the user to view an external display 10 of a portable telephone 9 contained within the portable telephone compartment 7 in order to obtain information regarding, for example, incoming calls on the portable telephone 9. With increased usage of graphical displays on that are externally visible on portable telephones (e.g., flip phones); the clear window 8 allows the user to quickly determine information about an incoming call or the operational status of the portable telephone 9 without removing the telephone from the portable telephone compartment 7.

In addition, in contrast to the configuration for the versatile portable telephone holder 1 shown in FIG. 1 to FIG. 7, the alternative configuration of versatile portable telephone holder 2 of FIG. 8 is oriented to be worn on the left side of the user. This would allow the user to wear one or more versatile telephone holders 1, 2 either on the left side, right side, or both sides of the user's body. The versatile portable telephone holders 1, 2 can be attached to at least one of the left side, right side, or both sides of the adjustable shoulder strap 3 through a fastener located internal to the first compartment 5 that secures the versatile portable telephone holders 1, 2 to one of the eyelet positions 11.

Further, the location of the versatile portable telephone holders 1, 2 on the adjustable shoulder strap 3 can be varied by using any of several different eyelet positions 11 on either the left side, right side or both sides of the adjustable shoulder strap 3. The eyelet positions 11 are used to fix the location of the versatile portable telephone holders 1, 2 along the adjustable shoulder strap 3 and allow the user to position the versatile telephone holders 1, 2 in order to optimize the ease of accessibility to the telephone and personal items that the compartments 5, 7, 25, 27 may contain.

The foregoing description illustrates and describes the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such, or other embodiments and with the various modifications required by the particular applications or uses of the invention. Accordingly, the description is not intended to limit the invention to the form or application disclosed herein. Also, it is intended that the appended claims be construed to include alternative embodiments.

The invention claimed is:

1. A portable telephone holder comprising:
    a first compartment configured to be secured with a first restraining strap;
    a portable telephone compartment configured to be secured with a second restraining strap and connected to and located below a front side of the first compartment;
    a second compartment connected to and located on a back side of the first compartment; and
    a third compartment connected to and located on a back side of the portable telephone compartment; and
    an adjustable shoulder strap located adjacent to and between the first compartment and the second compartment and configured to allow access to the second and third compartment by flipping the portable telephone holder by 180 degrees,
    wherein the first compartment, second compartment, third compartment and portable telephone compartment form an integrated portable telephone holder,
    wherein the portable telephone compartment is located, at an angle in the range of 0° (horizontal) to 90° (vertical) relative to the first compartment, and
    wherein a fixed location for the integrated portable telephone holder is adjustable to different eyelet positions along the adjustable strap.

2. The portable telephone holder of claim 1, wherein the telephone holder is configured to be worn on at least one of the left and right sides of a user.

3. The portable telephone holder of claim 1, wherein the first compartment further comprises at least one fastener for attaching the first compartment at different locations on at least one of an adjustable shoulder strap and belt.

4. The portable telephone holder of claim 3, wherein the first compartment and the portable telephone compartment further comprise restraining straps configured to both secure and provide easy access to the contents within each compartment.

5. The portable telephone holder of claim 4, wherein the second compartment and the third compartment further comprise fasteners configured to both secure and provide easy access to the contents within each compartment.

6. The portable telephone holder of claim 5, wherein the restraining strap of the first compartment and portable telephone compartment are secured to a front side of each compartment with at least one of a hook and eye fastener, a latch and hook, buttons, and zippers.

7. The portable telephone holder of claim 6, wherein the second compartment and third compartment are secured with at least one of a hook and eye fastener, a latch and hook, buttons, and zippers.

8. The portable telephone holder of claim 7, wherein the portable telephone compartment further comprises a clear window configured to allow contents of the portable telephone compartment to be viewed without opening the portable telephone compartment.

9. The portable telephone holder of claim 8, wherein the third compartment further comprises a clear window configured to allow contents of the third compartment to be viewed without opening the third compartment.

10. The portable telephone holder of claim 9, wherein the telephone holder is made of at least one of leather, plastic, spandex, and cloth.

11. A portable telephone holster comprising:
    an adjustable shoulder strap;

a decorative template configured to align the adjustable shoulder strap;

a first compartment configured to be secured with a first restraining strap and selectably attached to the adjustable shoulder strap;

a portable telephone compartment configured to be secured with a second restraining strap and connected to and located below a front side of the first compartment;

a second compartment connected to and located on a back side of the first compartment; and a third compartment connected to and located on a back side of the portable telephone compartment, wherein the adjustable shoulder strap located adjacent to and between the first compartment and the second compartment and configured to allow access to the second and third compartment by flipping the portable telephone holder by 180 degrees, wherein the first compartment, second compartment, third compartment and portable telephone compartment form an integrated portable telephone holster, wherein the portable telephone compartment is located, at an angle in the range of 0° (horizontal) to 90° (vertical) relative to the first compartment, and wherein a fixed location of the integrated portable telephone holdster is adjustable to different eyelets along the adjustable strap.

12. The portable telephone holster of claim 11, wherein the telephone holster is configured to be worn on at least one of the left and right sides of the adjustable strap.

13. The portable telephone holster of claim 11, wherein the adjustable strap further comprises at least three eyelets configured to provide for attaching the portable telephone holster at different locations on the adjustable shoulder strap.

14. The portable telephone holster of claim 13, wherein the first compartment further comprises at least one fastener for attaching the first compartment at different locations on the adjustable shoulder strap.

15. The portable telephone holster of claim 14, wherein the first compartment and the portable telephone compartment further comprise restraining straps configured to both secure and provide easy access to the contents within each compartment.

16. The portable telephone holster of claim 15, wherein the second compartment and the third compartment further comprise fasteners configured to both secure and provide easy access to the contents within each compartment.

17. The portable telephone holster of claim 16, wherein the restraining strap of the first compartment and portable telephone compartment are secured to a front side of each compartment with at least one of a hook and eye fastener, a latch and hook, buttons, and zippers.

18. The portable telephone holster of claim 17, wherein the second compartment and third compartment are secured with at least one of a hook and eye fastener, a latch and hook, buttons, and zippers.

19. The portable telephone holster of claim 18, wherein the portable telephone compartment further comprises a clear window configured to allow contents of the portable telephone compartment to be viewed without opening the portable telephone compartment.

20. The portable telephone holster of claim 19, wherein the third compartment further comprises a clear window configured to allow contents of the third compartment to be viewed without opening the third compartment.

21. The portable telephone holder of claim 1, wherein the adjustable shoulder strap is fed through the eyelets and configured to provide a criss-cross configuration of the adjustable shoulder strap that is positioned behind the back of the user and held in position with a decorative template.

22. The portable telephone holder of claim 21, wherein a location of the portable telephone holder on the adjustable shoulder strap is fixed at any one of a plurality of eyelet positions.

23. The portable telephone holder of claim 22, wherein the versatile portable telephone holder can be fixed at eyelets on either a left side or right side of the adjustable strap.

24. The portable telephone holder of claim 22, wherein versatile portable telephone holders can be simultaneously fixed at eyelets on both a left side and right side of the adjustable strap.

25. The portable telephone holster of claim 11, wherein the adjustable shoulder strap is fed through the eyelets and configured to provide a criss-cross configuration of the adjustable shoulder strap that is positioned behind the back of the user and held in position with a decorative template.

26. The portable telephone holster of claim 24, wherein a location of the portable telephone holder on the adjustable shoulder strap is fixed at any one of a plurality of eyelet positions.

27. The portable telephone holster of claim 26, wherein the versatile portable telephone holders can be fixed at eyelets on either a left side or right side of the adjustable strap.

28. The portable telephone holster of claim 26, wherein versatile portable telephone holders can be simultaneously fixed at eyelets on both a left side and right side of the adjustable strap.

* * * * *